(12) United States Patent
Mace

(10) Patent No.: US 7,845,574 B2
(45) Date of Patent: Dec. 7, 2010

(54) CARTRIDGE FOR A MIXER FAUCET, FAUCET COMPRISING A CARTRIDGE OF THIS TYPE, AND THERMOSTATIC ASSEMBLY TO BE FITTED TOGETHER WITH THIS CARTRIDGE

(75) Inventor: Christian Mace, Bruyeres le Chatel (FR)

(73) Assignee: Vernet, Ollainville (FR)

( * ) Notice: Subject to any disclaimer, the term of this patent is extended or adjusted under 35 U.S.C. 154(b) by 794 days.

(21) Appl. No.: 11/664,819

(22) PCT Filed: Oct. 7, 2005

(86) PCT No.: PCT/FR2005/002479

§ 371 (c)(1),
(2), (4) Date: Apr. 6, 2007

(87) PCT Pub. No.: WO2006/040456

PCT Pub. Date: Apr. 20, 2006

(65) Prior Publication Data

US 2007/0261738 A1 Nov. 15, 2007

(30) Foreign Application Priority Data

Oct. 8, 2004 (FR) .................................. 04 10657

(51) Int. Cl.
*G05D 23/185* (2006.01)

(52) U.S. Cl. ................ 236/12.11; 236/12.1; 236/12.13; 236/12.14; 236/12.15; 236/12.16; 236/12.2; 236/12.17; 236/12.21; 236/12.22; 236/12.23; 236/93 A; 236/99 J; 236/99 R; 236/100; 137/625.17; 137/625.4; 137/625.41

(58) Field of Classification Search ................ 236/12.1, 236/12.11, 12.13–12.17, 12.2, 12.21–12.23, 236/93 A, 99 J, 99 R, 100; 137/625.17, 625.4, 137/625.41
See application file for complete search history.

(56) References Cited

U.S. PATENT DOCUMENTS 3,765,604 A 10/1973 Trubert et al.
(Continued)

FOREIGN PATENT DOCUMENTS

CN 2041753 7/1989
(Continued)

*Primary Examiner*—Frantz F Jules
*Assistant Examiner*—Azim Rahim
(74) *Attorney, Agent, or Firm*—Dowell & Dowell, P.C.

(57) ABSTRACT

The cartridge comprises two ceramic disks (20, 24) for regulating the temperature and flow of a mixture (M) of two entering fluids. In order to ensure that the temperature of the mixture remains lower than a predetermined value, the cartridge comprises thermostatic means (16) designed for, in the event of a high-temperature mixture, automatically shutting off, upstream from these disks, the circulation of the entering fluid (C) of the highest temperature. In order to limit their size, these means comprise: a closure element (34), which serves to close a passage (56) of the fluid (C) having the highest temperature and which is delimited by the cartridge, and; a thermostatic element (36) including a thermosensitive part (38) placed along the flow path of the mixture and a mobile part (40) connected in translation to the closure element, said closure element being mounted in a manner that enables it to slide in an area (42A) of the passage of the fluid of the highest temperature, with the interposition of a packing seal (58), which is joined to this area and which, when the temperature of the mixture is greater than the predetermined value, is capable of forming a sliding tight contact with the closure element.

14 Claims, 3 Drawing Sheets

U.S. PATENT DOCUMENTS

| | | |
|---|---|---|
| 4,475,684 A | 10/1984 | Garlick et al. |
| 5,983,918 A * | 11/1999 | Chang ........................ 137/98 |
| 6,257,493 B1 | 7/2001 | Chamot et al. ........... 236/12.13 |

FOREIGN PATENT DOCUMENTS

| | | | |
|---|---|---|---|
| DE | 1241220 B | 5/1967 |
| EP | 1048997 A1 | 11/2000 |
| EP | 1120553 A | 8/2001 |
| FR | 2424459 A | 11/1979 |

\* cited by examiner

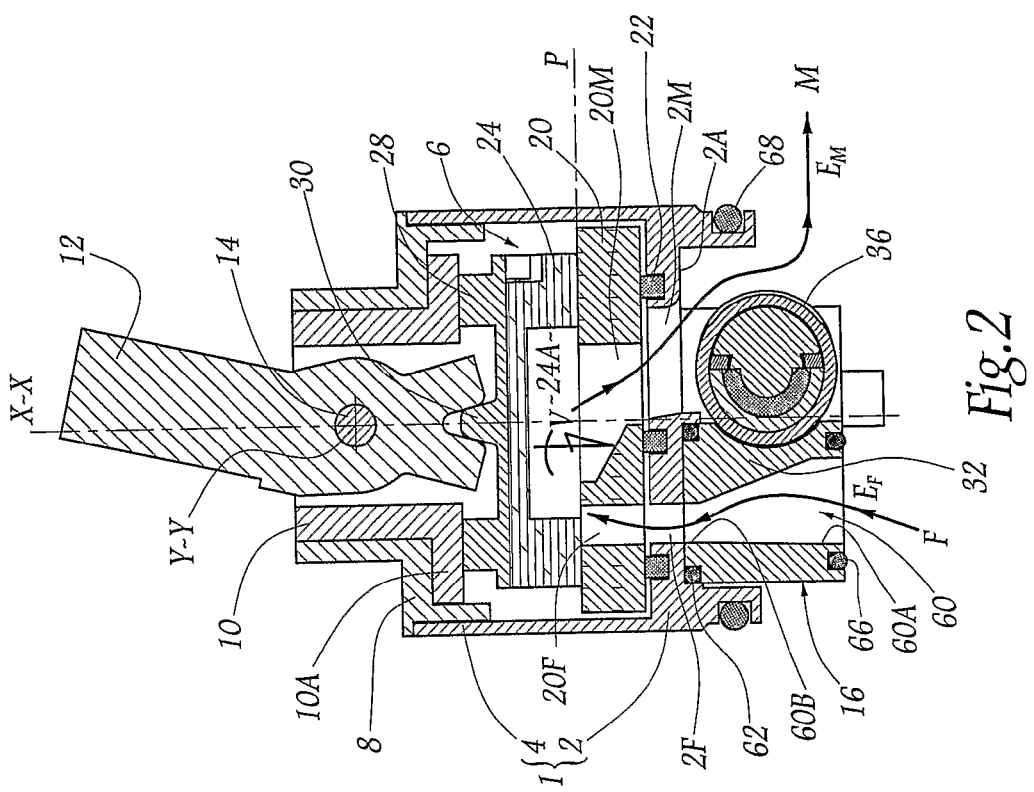
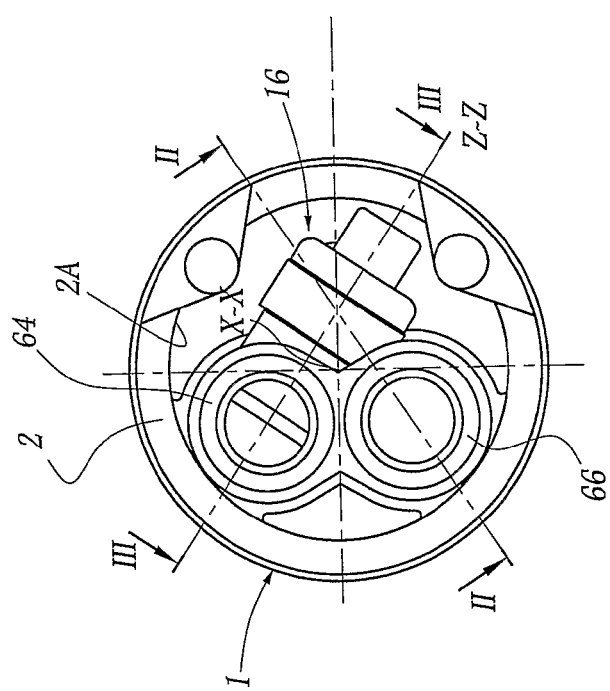
Fig.2
Fig.1

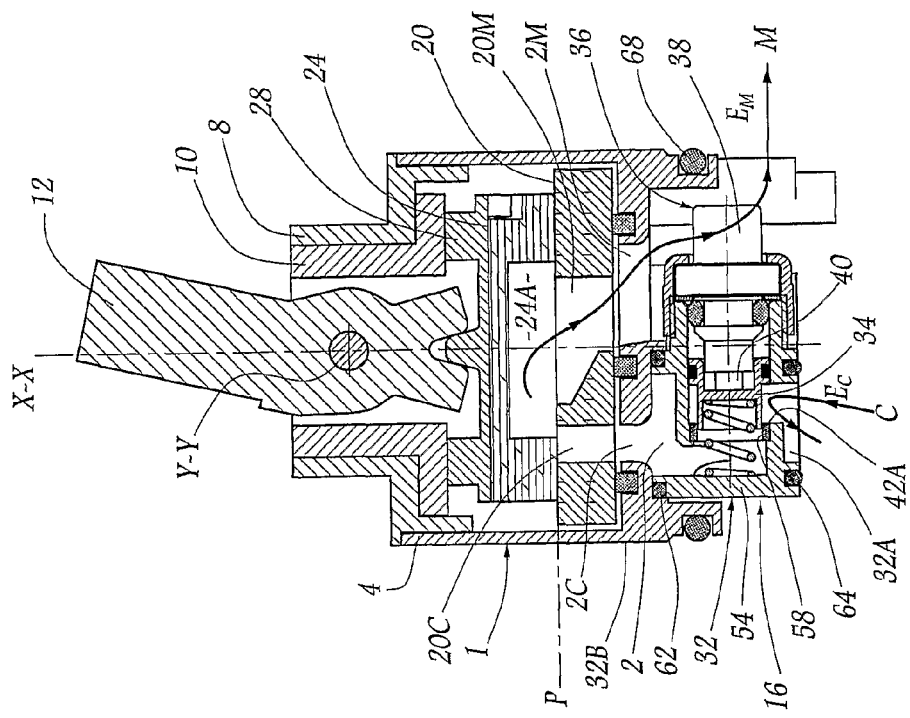
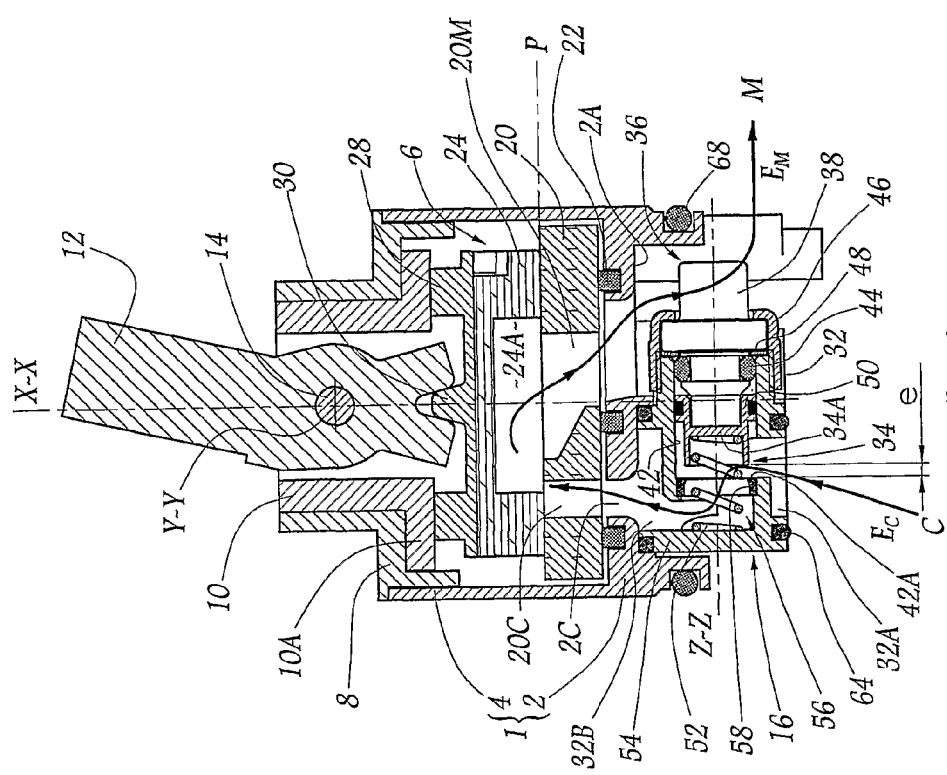

CARTRIDGE FOR A MIXER FAUCET, FAUCET COMPRISING A CARTRIDGE OF THIS TYPE, AND THERMOSTATIC ASSEMBLY TO BE FITTED TOGETHER WITH THIS CARTRIDGE

BACKGROUND OF THE INVENTION

1. Field of the Invention

The present invention relates to a cartridge for a mixer faucet and a mixer faucet fitted with such a cartridge, and a thermostatic assembly for regulating a stream of fluid.

2. Brief Description of the Related Art

The invention relates more particularly to the faucet cartridges supplied with two fluids having different respective temperatures, designed to be mixed inside the cartridge by means of at least two ceramic disks that can be moved relative to one another. To modify the relative configuration of these disks, and thereby control the temperature and the flow of the mixture, the cartridges are usually fitted with a single operating member, consisting, in practice, of a lever more or less inclined relative to the central longitudinal axis of the cartridge. This lever is designed to be operated by the user of the faucet so that, usually, a rotation of the lever about the longitudinal axis of the cartridge modifies the temperature of the mixed fluid while a tilting of the lever, while remaining in the same vertical plane, modifies the flow of the mixture. A composition of these two movements makes it possible to modify both the temperature and the flow. Thus, the proportion of the two mixed fluids may vary from 100%-0% to 0%-100%, which means that the temperature of the mixture may vary from "all cold" to "all hot".

Such faucets are routinely used in the installations for delivering domestic water, in which the hot water is delivered at a temperature that can reach 80° C. approximately, so that the risks of scalding are real.

For the purpose of remedying this disadvantage, it has been proposed to provide a stop to block the rotation of the lever before the cold water inlet duct is completely closed off, which makes it possible to limit the temperature of the mixed water on the "hot" side. However, the positioning of this stop depends on the pressure and temperature conditions of the cold water and of the hot water supplying the cartridge. Consequently, when, for example, the cold water pressure falls or the hot water temperature increases, the temperature of the mixed water increases by several degrees and thereby reaches a level at which the risk of scalding subsists. In addition, in the case of a total cut-off of cold water supply, the water coming out of the cartridge has a temperature equal to that of the hot water coming in, which is particularly dangerous.

Thermostatic cartridges with a single regulating lever are furthermore known, for example from WO-A-96/26475. They are costly and have a large space requirement which renders them, in practice, unusable in standard size mixer faucets that are usually designed to receive a cartridge of 40 mm in diameter.

Another example of a thermostatic cartridge is provided by EP-A-1 048 997. This cartridge includes a bypass duct directly connecting a cold water inlet to a mixed water outlet, the closing of this duct being controlled by a thermostatic element whose heat-sensitive portion is swept over by the flow of mixed water. If the temperature of the mixed water is too high, the cold water is directly admitted at the outlet of the cartridge via the bypass duct. However, in the case of an insufficient supply of cold water, and even in the case of total cut-off, the risks of scalding persist. In addition, the space requirement of the arrangements relating to the bypass duct makes them difficult to install in standard size cartridges.

In another field, namely that of conventional valves, that is to say whose faucet body is not designed to receive interchangeable cartridges, particularly cartridges with ceramic disks, FR-A-2 424 459 proposes a mixer faucet whose body incorporates a thermostatic element whose heat-sensitive portion is swept over by the flow of mixed water coming out of the faucet, while its piston operates a valve element for closing off the flow of hot water entering the faucet. The hot water inlet channel is furnished for this purpose with a sealing ring against which the valve element presses in its direction of translation by the piston when the temperature of the mixed water reaches a predetermined value. If this temperature is exceeded, the valve element presses on the ring and moves it in translation along the channel, compressing a dedicated spring inserted between the ring and a wall of the faucet body. This spring makes it possible to push the ring back to its initial position along the hot water channel when the temperature of the mixed water reduces. This spring, which therefore serves as an overtravel spring for the thermostatic element and which is indispensable to the correct operation of the faucet, occupies a significant space within the faucet body and substantially increases its space requirement in the longitudinal direction of the thermostatic element. The faucet body consequently has a longitudinal dimension much greater than that of standard faucets and hence very much greater than the diameter of the interchangeable cartridges capable of being fitted into such standard faucets.

SUMMARY OF THE INVENTION

The object of the invention is to propose a cartridge that guarantees better anti-scalding safety, without requiring complex and bulky arrangements relative to existing cartridges, in particular by retaining an arrangement with two ceramic regulating disks and making it possible to comply with the dimensional standard of 40 mm for the diameter of the cartridge.

Accordingly, the subject of the invention is a cartridge for a mixer faucet, comprising two ceramic disks for regulating the temperature and flow of a mixture of two fluids entering the cartridge at different respective temperatures and thermostatic means suitable for, when the temperature of the mixture is greater than a predetermined threshold value, automatically cutting off, upstream of the disks, at least a portion of the circulation, in the cartridge, of the hottest entering fluid, which thermostatic means comprise:
  a stopper of a passageway of the hottest fluid delimited by the cartridge upstream of the disks, and
  a thermostatic element including both a heat-sensitive portion placed, at least partly, in the flow path of the mixture in the cartridge and downstream of the two disks, and a movable portion that can move in translation relative to the heat-sensitive portion, linked in translation to the stopper, the stopper being mounted so as to slide, in the direction of translation of the movable portion, in a zone of the cartridge delimiting the passageway of the hottest fluid, with interposition of a packing seal that is fixedly attached either to this zone, or to the stopper and that, when the temperature of the mixture is greater than the predetermined threshold value, is capable of forming a sliding sealed contact with the stopper or the aforesaid zone respectively.

The cartridge according to the invention therefore has a function of thermostatically limiting the temperature of the mixture coming out of the cartridge, which thereby prevents the risks of scalding. The arrangement of the corresponding thermostatic means does not compromise the use of most of the components of the existing cartridges, in particular of the ceramic regulating disks, that are both reliable and costly components, and of a single lever for controlling the flow and temperature of the mixture, this type of "monocontrol" lever being particularly widely used and liked by the users. In addition, thanks to the packing seal which makes it possible both to provide a watertight closure of the passageway of the hottest fluid and to accommodate the potential overtravel of the piston of the thermostatic element, the space requirement of these thermostatic means may be planned to be sufficiently small for the cartridge according to the invention to be able to be mounted in place of an existing cartridge and, in particular, of a cartridge with an external diameter of the order of 40 mm.

According to advantageous features of this cartridge, taken in isolation or in all the technically possible combinations:

the packing seal is made of an elastically deformable material;

the packing seal has an annular shape suitable for maintaining the sliding sealed contact when the temperature of the mixture exceeds the temperature associated with the beginning of the total cut-off of the circulation of the hottest entering fluid;

the stopper is tubular and, if the seal is fixedly attached to the aforesaid zone, the seal is capable of forming the sliding sealed contact on the whole periphery of the outer face of the stopper, while, if the seal is fixedly attached to the stopper, the seal extends over the whole periphery of the outer face of the stopper;

the two ceramic disks are joined by one of their faces and the direction of translation of the movable portion of the thermostatic element relative to the heat-sensitive portion is substantially parallel to the joining plane of the disks;

the thermostatic means comprise a socket body for supporting the thermostatic element and the stopper, delimiting, at least in part, the passageway of the hottest fluid and suitable for being fitted removably to a case of the cartridge, in which the ceramic disks are arranged;

the aforesaid zone is delimited by the socket body;

the socket body also delimits a freely traversing passageway for the coldest entering fluid;

in the direction of translation of the movable portion of the thermostatic element, the maximum dimension of the socket body fitted with the thermostatic element and the stopper is less than 40 mm;

the thermostatic means comprise a return means for returning the movable portion to the heat-sensitive portion of the thermostatic element, this return means pressing both on a wall of the socket body and on the stopper.

A further subject of the invention is a mixer faucet fitted with a cartridge as defined hereinabove.

Another subject of the invention is a thermostatic assembly for regulating a stream of fluid, capable of being incorporated into a mixer faucet cartridge as defined hereinabove, comprising a thermostatic element including a heat-sensitive portion and a movable portion that can move in translation relative to the heat-sensitive portion, a stopper connected in translation to the movable portion of the thermostatic element, and a socket body for supporting the thermostatic element and the stopper, delimiting a passageway for the stream of fluid capable of being closed off by the stopper, wherein the socket body is suitable for being fitted removably to a case of a mixer faucet cartridge, in which at least two ceramic disks are arranged for regulating the temperature and the flow of a mixture of the stream of fluid with another stream of fluid whose temperature is below that of the stream of fluid regulated by the thermostatic assembly, so that, on the one hand, the fluid passageway delimited by the socket body emerges upstream of the ceramic disks and, on the other hand, the heat-sensitive portion of the thermostatic element is placed, at least in part, in the flow path of the mixture downstream of the two disks, the stopper closing off at least partially the fluid passageway when the temperature of the mixture is greater than a predetermined threshold value and being mounted so as to slide, in the direction of translation of the movable portion, in a zone of the cartridge delimiting the fluid passageway, with interposition of a packing seal that is fixedly attached either to this zone, or to the stopper and that, when the temperature of the mixture is greater than the predetermined threshold value, is capable of forming a sliding sealed contact with the stopper or the aforesaid zone respectively.

BRIEF DESCRIPTION OF THE DRAWINGS

The invention will be better understood on reading the following description, given only as an example and made with reference to the drawings in which:

FIG. 1 is a view in elevation of one end of a mixer faucet cartridge according to the invention;

FIGS. 2 and 3 are sections respectively along the planes II-II and III-III of FIG. 1;

FIG. 4 is a view similar to FIG. 3, illustrating a different operating state of the cartridge;

FIGS. 1 to 4 represent a mixer faucet cartridge designed to be fitted to a water supply faucet, particularly for a domestic installation. For convenience, the rest of the description will be oriented considering the term "top" to relate to the top portion of FIGS. 2 to 4 while the term "bottom" relates to an opposite direction.

DESCRIPTION OF THE PREFERRED EMBODIMENTS

Figure 5:
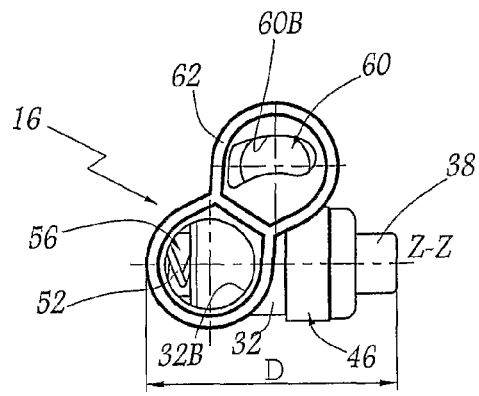
FIG. 5 is a view in elevation, taken in the direction of the arrow V indicated in FIG. 2, of a thermostatic regulating assembly according to the invention fitted to the cartridge of FIGS. 1 to 4.

This cartridge comprises a rigid body 1 forming a case, with a generally cylindrical outer face with an axis X-X. This case comprises a bottom base 2 above which a tubular skirt 4 centered on the axis X-X extends. This defines an internal volume 6, delimited, at the bottom, by the base 2, and, at the top, by a cover 8 fixedly attached to the top end of the skirt 4, for example by clips. The cover 8 has a central opening inside which is guided a bush 10 furnished with a collar 10A pressed against the bottom face of the cover 8, so that the bush 10 can be moved in rotation about the axis X-X relative to the fixed cover. This rotation is limited by a system of stops that is not shown, over an angle of approximately a quarter turn.

A lever 12, designed to be operated by the user of the faucet to control the flow and temperature of the water delivered at the outlet of the cartridge, hence delivered by the faucet, is housed in the bush 10, a shaft 14, of longitudinal axis Y-Y perpendicular to the axis X-X, linking these two parts. The lever 12 can therefore be tilted about the axis Y-Y relative to the bush 10, through a limited angle of approximately 25° by means of a system of stops, not shown.

The base 2 of the case 1 delimits, in its bottom end portion, a generally cylindrical cavity 2A with an axis X-X and receiving a thermostatic assembly 16 detailed below. This cavity 2A communicates with the internal volume 6 via three throughorifices delimited by the base 2, namely:

a first inlet orifice 2F designed to supply the volume 6 with water, hereinafter called "cold water F", originating from the cavity 2A and having a first temperature, a second inlet orifice 2C designed to supply the volume 6 with water, hereinafter called "hot water C", originating from the cavity 2A and having a second temperature higher than the first temperature, and an outlet orifice 2M designed to discharge, from the volume 6 to the cavity 2A, water, hereinafter called "mixed water M", having a temperature controlled in the range from the first to the second temperature.

The regulation by the user of the temperature and of the flow of the mixed water M is carried out inside the volume 6 by means of the following elements:

a bottom ceramic disk 20, centered on the axis X-X, and fixedly linked to the case 1, for example by means of a system of lugs; this fixed disk comprises a cold water through passageway 20F, a hot water through passageway 20C and a mixed water through passageway 20M, these three passageways being in correspondence respectively with the orifices 2F, 2C and 2M of the base 2 of the case, with interposition of a seal 22;

a top ceramic disk 24 pressed movably against the top surface of the bottom disk 20, forming with the latter a flat pressing connection perpendicular to the axis X-X; the facing faces of the disks 20 and 24, thus joined along a plane marked P, are capable of providing the seal between the disks, including during movements of the disk 24 relative to the fixed disk 20; the bottom face of the disk 24 makes, above the plane P, a cavity 24A which, on the one hand, is in permanent fluid communication with the mixed water passageway 20M of the disk 20 and, on the other hand, may or may not be connected with the cold water passageway 20F and hot water passageway 20C depending on the relative position of the disk 24 relative to the disk 20; and an operating disk 28 pressed, on the one hand, against the bottom face of the collar 10A of the bush 10 and, on the other hand, against the top face of the movable disk 24; this operating disk 28 is therefore connected, via flat bearing faces perpendicular to the axis X-X, to the bush 10 and to the disk 24; the disk 28 is also connected to the lever 12 by a tooth gear system 30 consisting of a pivot link along an axis parallel to the axis Y-Y.

The stacking of the disks 20, 24 and 28 is maintained by the seal 22 which generates a sufficient force to press these disks against the collar 10A of the bush 10.

Except for the cavity 2A in the bottom base 2 of the case 1 and for the thermostatic assembly 16, the arrangements of the cartridge described hitherto are standard arrangements for a cartridge with a single control lever and with ceramic disks. The use of such disks is liked because of their excellent sealing capability at their joining plane P, the risks of leakage between these disks, even after a long period of use, being very slight.

Figure 6:
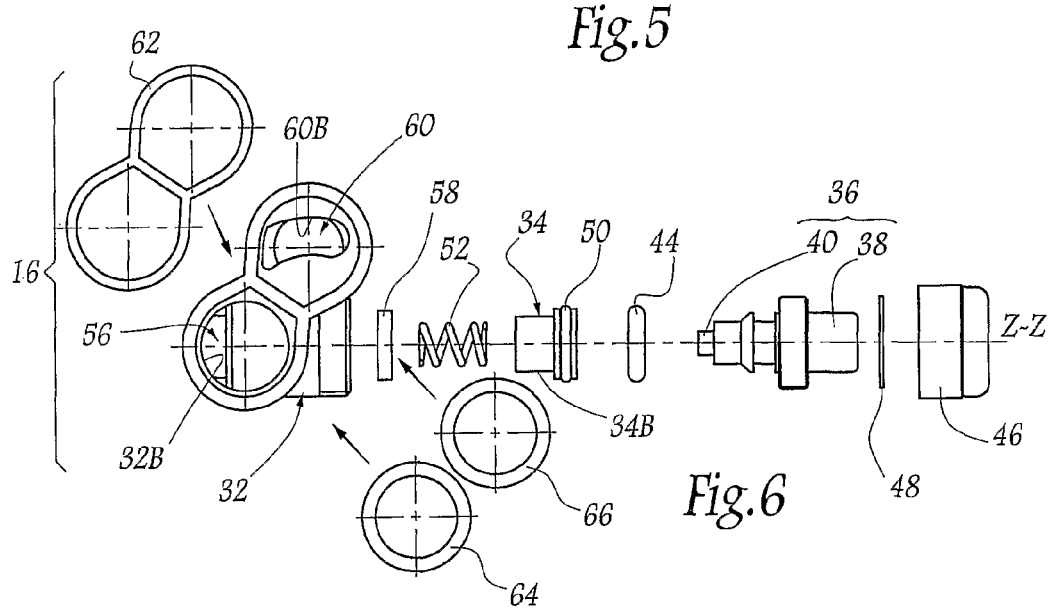
FIG. 6 is an exploded view in elevation of the assembly of FIG. 5.

According to the invention, the cartridge of FIGS. 1 to 4 is fitted with the thermostatic assembly 16 shown alone in FIGS. 5 and 6. This assembly essentially comprises a socket body 32 made of a plastic, for example similar to that of the case 1, a tubular valve element 34 and a thermostatic element 36 comprising a heat-sensitive portion 38, that contains an expandable wax, and a piston 40 which, under the effect of the expansion of the wax, is moved in translation relative to the portion 38 along an axis Z-Z about which the thermostatic element extends lengthwise.

The socket body 32 delimits a generally cylindrical internal volume 42, inside which the thermostatic element 36 is fitted coaxially with interposition of an annular seal 44. The body of the thermostatic element, that includes the heat-sensitive portion 38, is immobilized relative to the socket body 32 by means of a nut 46 threaded about the heat-sensitive portion 38, with interposition, along the axis Z-Z, of a sealing washer 48. In the assembled state, the piston 40 of the thermostatic element is situated inside the internal volume 42 of the socket body 32 while its heat-sensitive portion 38 is essentially placed outside this volume.

On the side opposite to the heat-sensitive portion 38, along the axis Z-Z, the internal volume 42 of the socket body 32 opens radially onto the outside at a bottom orifice 32A and a top orifice 32B delimited by the socket body 32.

The valve element 34 is mounted so as to slide in the internal volume 42 of the socket body 32, along the axis Z-Z. Accordingly, the valve element is furnished, at its end turned toward the thermostatic element 36, with a flange 50 making a sliding and sealed contact with the cylindrical wall of the socket body delimiting the volume 42.

The movements in translation of the valve element are controlled by the piston 40 of the thermostatic element 36. Accordingly, the valve element 34 comprises, in its intermediate portion, an internal transverse wall 34A pressing on the piston 40 when the latter is deployed against the body of the thermostatic element 36, as in FIG. 4, or, when this piston is fully retracted, pressing directly against the fixed body of the element, as in FIG. 3. To press the valve element 34 against the thermostatic element 36, a compression spring 52 is interposed between the valve element and the socket body 32, on the side of the wall 34A opposite to that of the thermostatic element. This spring advantageously extends about the axis Z-Z, with one of its ends pressing against the wall 34A while its opposite end is pressing against a wall 54 of the socket body 32 perpendicular to the axis Z-Z.

The orifices 32A and 32B open into a portion of the sealed volume 42, facing the thermostatic element 36, via the flange 50 of the wall 34A of the valve element 34. This portion of the volume 42 and the orifices 32A and 32B thereby define a fluid passageway 56 passing through the socket body 32 in a direction generally radial to the axis Z-Z. The circulation of a fluid in this passageway however depends on the position of the valve element 34 relative to the socket body 32. When the valve element is pressing against the body of the thermostatic element 36, as in FIG. 3, the valve element is axially at a distance from the zone 42A of junction between the internal volume 42 and the bottom orifice 32A, the corresponding axial distance being marked e, so that this orifice 32A and the volume 42 are in fluid communication. Since the volume is in permanent fluid communication with the top orifice 32B, the passageway 56 is then open to circulation. On the other hand, when the valve element 34 is moved in the direction of the wall 54 of the socket body over a distance greater than e, as in FIG. 4, the zone of junction 42A is closed off and the fluid passageway 56 is cut off.

To minimize the risks of fluid leaks at the zone of junction 42A when the valve element is moved as in FIG. 4, this zone is furnished with a sealing ring 58 fixedly attached to the socket body 32. This ring is made of an elastically deformable material and has an internal diameter substantially equal to the diameter of the outer cylindrical face 34B of the valve element 34. The ring 58 thereby maintains a sealed contact over the whole periphery of the valve element 34 when the latter is moved sufficiently toward the wall of the socket body 54, even if the valve element undergoes translation movements and slides against the ring. In other words, when the valve element is moved sufficiently toward the wall 54, as in FIG. 4, the ring 58, immobile relative to the socket body 32, is interposed between the stopper and the zone 42A of the socket body in a direction substantially radial to the axis Z-Z.

The socket body 32 also delimits a second fluid passageway 60, distinct from the passageway 56 and oriented in a direction generally parallel to that of the passageway 56.

The socket body 32 is suitable for being fitted removably into the cavity 2A delimited by the base 2 of the case 1 of the cartridge. As shown in FIGS. 1 to 4, the socket body 32 is then pressed against the bottom of the cavity 2A, so that its top orifice 32B opens directly into the hot water inlet orifice 2C of the base 2 (FIG. 3), while the top orifice 60B of the passageway 60 opens directly into the cold water inlet orifice 2F (FIG. 2). The mixed water outlet orifice 2M opens, for its part, level with the nut 46 and the heat-sensitive portion 38 of the thermostatic element. In this fitted configuration of the socket body 32, the axis Z-Z extends perpendicular to the axis X-X of the cartridge, these axes however not intersecting. The junction of the passageway 56 with the orifice 2C and that of the passageway 60 with the orifice 2F are sealed by a double seal 62.

The cartridge fitted with the thermostatic assembly 16 is designed to be arranged in a faucet body whose hot water supply C and cold water supply F are in correspondence respectively with the orifice 32A and the bottom orifice 60A of the passageway 60, with interposition of seals 64 and 66, while the mixed water discharge duct M of the faucet is in fluid communication with the outflow zone of the orifice 2M in the cavity 2A, with interposition of a seal 68.

The operation of the cartridge is as follows:

In normal operation shown in FIGS. 2 and 3, that is to say when the faucet is supplied simultaneously with cold water F and with hot water C and the lever 12 occupies a position controlling a mixed temperature that is in principle not very high, the cold water F rises in the passageway 60 of the socket body 32, then successively in the orifices 2F and 20F to terminate in the cavity 24A of the top disk 24. In parallel, the hot water C rises in the orifice 32A of the socket body 32, enters the volume 42 by flowing round the valve element 34, passes through the space e defined between the free end of the valve element and the sealing ring 58, then rises successively through the top orifice 32B of the socket body, through the orifice 2C of the case 1 and through the orifice 20C of the disk 20 to terminate in the cavity 24A. The hot water C and the cold water F then mix in the cavity 24A to form the mixed water M. This mixed water M descends again successively through the orifices 20M of the disk 20 and 2M of the case 2 to come out of the cartridge and then travel toward the outlet of the faucet, a portion of the mixed water, downstream of the disk 20, then flowing around the heat-sensitive portion 38 of the thermostatic element 36. The cold water F, hot water C and mixed water M flows are respectively indicated by the arrows $E_F$, $E_C$ and $E_M$.

While the temperature of the heat-sensitive portion 38 is less than the predetermined threshold value $T_d$ corresponding to the temperature of the beginning of movement of the piston 40 out of the fixed portion of the thermostatic element 36 induced by the expansion of the wax contained in this fixed portion, the flow and temperature of the mixed water M are regulated by adjusting the passageway cross sections of hot water C and cold water F between the top disk 24 and bottom disk 20, these passageway cross sections corresponding to the cross sections resulting respectively from the conjunction of the hot water inlet orifice 20C of the disk 20 with the mixture cavity 24A of the disk 24 and of the conjunction of the cold water inlet orifice 20F of the disk 20 with this mixture cavity. These cross sections are adjusted by moving, parallel to the plane P, the top disk 24 over the bottom disk 20 with the aid of the lever 12, by means of the operating disk 28. The flow of mixed water M is regulated from closed to fully open by tilting the lever 12 about the axis Y-Y while the temperature of this mixed water is regulated from all cold to all hot by rotating the lever about the axis X-X.

Following an action on the control lever 12, a drop in the pressure or temperature of cold water F supplying the faucet and/or an increase in pressure or temperature of the hot water C supplying the faucet, the temperature of the mixed water M coming out of the cartridge may exceed the temperature threshold value $T_d$. In this case, the wax contained in the heat-sensitive portion 38 expands and moves the piston 40 along the axis Z-Z relative to the body of the thermostatic element 36, moving the valve element 34 in the direction of the sealing ring 58, thus reducing the space e and partially cutting off the circulation of hot water $E_C$ in the passageway 56. If the temperature of mixed water reaches a temperature value hereinafter called $T_f$, the translation movement imposed on the valve element 34 by the piston 40 is such that the valve element comes into contact with the sealing ring 58. The circulation of hot water $E_C$ along the passageway 56 is then totally stopped. If the temperature of mixed water M continues to increase and exceeds the temperature $T_f$ associated with the beginning of the total cut-off of circulation of hot water $E_C$, the piston 40 continues to move the valve element 34 in translation that then slides inside the sealing ring 58, as shown in FIG. 4. The circulation of hot water $E_C$ remains totally cut off.

In other words, when the temperature of the mixed water M coming out of the cartridge has a value lying between $T_d$ and $T_f$, the thermostatic assembly 16 reduces the flow of hot water C upstream of the disks 20 and 24 by moving the valve 34 closer to the sealing ring 58, thereby lowering the temperature of the mixed water. When the temperature of the mixed water M coming out of the cartridge is equal to or greater than the threshold value $T_f$, the thermostatic assembly 16 totally cuts off the hot water passageway 56 and the hot water C no longer reaches the inlet orifice 2C of the case 1, so that the water coming out of the cartridge then consists only of the cold water F supplying the cartridge.

While the piston 40 is deployed, the drop in temperature of the mixed water M, where necessary to the temperature of cold water F, causes the piston to retract and, under the effect of the spring 52, the return of the valve element to its initial position. Therefore, when the temperature of the mixed water M returns below the value $T_f$, the valve element 34 withdraws from the sealing ring 58, reestablishing, at least partially, the circulation $E_C$ of hot water C in the passageway 56.

The thermostatic assembly 16 therefore stabilizes the temperature of the mixed water M at a value lying between $T_d$ and $T_f$ when the control conditions or the variations in pressure and/or temperature of the hot water or cold water supply would cause, in the absence of this assembly 16, a temperature higher than $T_f$. In practice, the temperature values $T_d$ and $T_f$ may be relatively close.

Furthermore, if a break in supply of cold water F occurs and if the temperature of the hot water C supplying the cartridge is greater than $T_f$, no water flows out of the cartridge until the cold water supply is reestablished.

Therefore, in all situations, the temperature of the mixed water M is limited to the temperature value $T_f$, chosen to prevent scalding.

The use of the sealing ring 58, that makes it possible both to seal closed the passageway 56 and to slide the element 34 beyond its translated position associated with the temperature value $T_f$, avoids the incorporation into the thermostatic assembly 16 of complex and more costly systems designed to make up for the overtravel of the piston 40 of the thermostatic element 36. The space requirement of the thermostatic element 16 is consequently particularly small, allowing the cartridge according to the invention to be able to be mounted in a faucet body having an internal diameter of less than 40 mm. In other words, the maximum dimension D along the axis Z-Z, of the assembly 16 is advantageously less than 40 mm.

Figure 7:
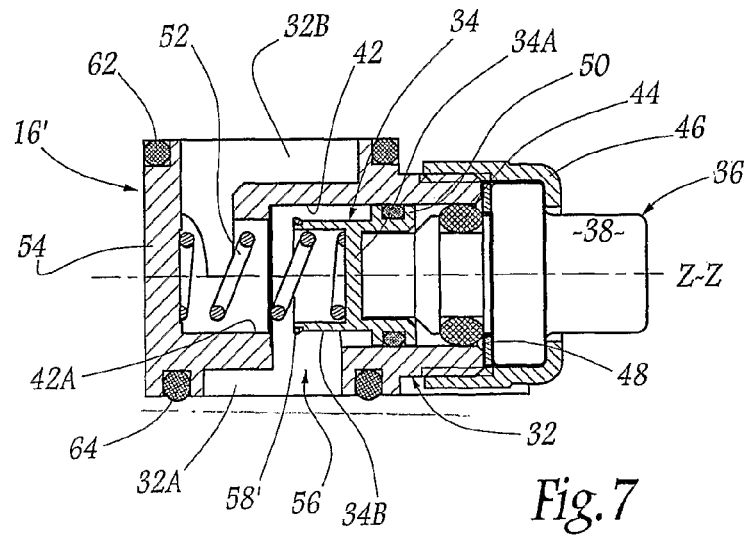
FIG. 7 is a schematic longitudinal section along the plane of FIG. 3, of a variant of the regulating assembly of FIGS. 5 and 6.

FIG. 7 shows a variant 16' of the thermostatic assembly 16 of the preceding figures. According to this variant, the seal between the zone of junction 42A of the socket body 32 and the outer cylindrical surface 34B of the valve element 34 is provided by a sealing ring 58' which, unlike the ring 58 of the preceding figures, is fixedly attached to the surface 34B of the valve element 34. In operation, when the valve element 34 is moved toward the wall 54 of the socket body 32, the ring 58' slides against the wall of the socket body that delimits the zone of junction 42A.

Various arrangements and variants to the cartridge and its thermostatic assembly described above can also be envisaged. In particular, the geometry of the socket body 32 may be adapted to the faucet in which the cartridge is designed to be installed (and/or to the case 1 of the cartridge to be fitted with the thermostatic assembly 16, 16'. Furthermore, as a variant not shown, the socket body 32 may be made of the same material and in one piece with the base 2 of the case 1.

The invention claimed is:

1. A cartridge for a mixer faucet, comprising two ceramic disks for regulating a temperature and flow of a mixture (M) of two fluids (F,C) entering the cartridge at different respective temperatures, and thermostatic means suitable for, when the temperature of the mixture is greater than a first predetermined threshold value ($T_d$), automatically regulating flow, upstream of the disks, of the hottest entering fluid (C), which thermostatic means includes:

a valve element for controlling flow of the hottest fluid (C) through a passageway defined by the cartridge upstream of the disks, and a thermostatic element including both a heat sensitive portion placed, at least partly, in the flow path of the mixture (M) in the cartridge and downstream of the two disks, and a movable portion that moves in translation relative to the heat sensitive portion and which moves the valve element to regulate flow through the passageway of the hottest fluid (C) to thereby regulate the temperature of the mixture (M), and a seal for sealing the valve element relative to the passageway of the hottest fluid when the temperature of the mixture (M) is greater than a second predetermined threshold value ($T_f$).

2. The cartridge as claimed in claim 1, wherein the seal is made of an elastically deformable material.

3. The cartridge as claimed in claim 1, wherein the seal has an annular shape for maintaining a sliding sealed contact when the temperature of the mixture (M) exceeds the temperature ($T_f$) associated with total cut-off of the circulation of the hottest fluid (C) entering the cartridge.

4. The cartridge as claimed in claim 1 wherein the valve element is tubular and wherein, the seal is fixedly attached to a valve seat defined by the passageway.

5. The cartridge as claimed in claim 1, wherein the two ceramic disks have faces that abut one another along a plane (P) and wherein the direction of translation of the movable portion of the thermostatic element relative to the heat-sensitive portion is substantially parallel to the plane (P).

6. The cartridge as claimed in claim 1, wherein the thermostatic means includes a socket body in which the thermostatic element and the valve element are supported and which also, at least in part, forms the passageway of the hottest fluid (C), and the socket body being fitted to a case of the cartridge in which the ceramic disks are arranged.

7. The cartridge as claimed in claim 6, wherein the socket body completely forms the passageway.

8. The cartridge as claimed in claim 6, wherein the socket body also includes a freely traversing passageway for the coldest (F) entering fluid.

9. The cartridge as claimed in claim 6, wherein, in the direction of translation of the movable portion of the thermostatic element, a maximum dimension (D) of the socket body fitted with the thermostatic element and the stopper valve element is less than 40 mm.

10. The cartridge as claimed in claim 6, wherein the thermostatic means includes a return means for urging the movable portion toward the heat-sensitive portion of the thermostatic element, this return means pressing both on a wall of the socket body and on the valve element.

11. A mixer faucet, wherein the mixer facet is fitted with the cartridge as claimed in claim 1.

12. A thermostatic assembly for regulating a stream of fluid, comprising a thermostatic element including a heat sensitive portion and a movable portion that can move in translation relative to the heat-sensitive portion, a valve element connected in to the movable portion of the thermostatic element, and a socket body for supporting the thermostatic element and the valve element, the socket body defining a passageway for the stream of fluid capable of being closed off by the valve element, wherein the socket body is removably fitted to a case of a mixer faucet cartridge, in which at least two ceramic disks are arranged for regulating a temperature and a flow of a mixture (M) of a first stream of fluid with a second stream of fluid whose temperature is below that of the first stream of fluid regulated by the thermostatic assembly, the fluid passageway by the socket body being positioned upstream of the ceramic disks and the heat sensitive portion of the thermostatic element being positioned, at least in part, in a flow path of the mixture (M) downstream of the two disks, the valve element partially closing off the fluid passageway when a temperature of the mixture (M) is greater than a predetermined threshold value ($T_d$) as the valve element is mounted so as to slide, in a direction of translation of the movable portion in a manner so as to regulate the flow of the first fluid through the fluid passageway, and a seal for sealing the valve element with respect to the fluid passageway when the temperature of the mixture (M) is greater than a second predetermined threshold value ($T_f$).

13. A mixer faucet, wherein the mixer faucet is fitted with the cartridge as claimed in claim 6.

14. The cartridge as claimed in claim 1 wherein the seal is carried by the valve element.

* * * * *